(12) United States Patent
McGowan et al.

(10) Patent No.: US 8,179,960 B2
(45) Date of Patent: May 15, 2012

(54) METHOD AND APPARATUS FOR PERFORMING VIDEO CODING AND DECODING WITH USE OF VIRTUAL REFERENCE DATA

(75) Inventors: James William McGowan, Flemington, NJ (US); Michael Charles Recchione, Nutley, NJ (US)

(73) Assignee: Alcatel Lucent, Paris (FR)

( * ) Notice: Subject to any disclaimer, the term of this patent is extended or adjusted under 35 U.S.C. 154(b) by 830 days.

(21) Appl. No.: 12/291,570

(22) Filed: Nov. 12, 2008

(65) Prior Publication Data

US 2010/0118958 A1 May 13, 2010

(51) Int. Cl.
*H04N 11/02* (2006.01)
(52) U.S. Cl. .............................. 375/240.01; 375/240.16
(58) Field of Classification Search .................. 375/240, 375/240.01, 240.12, 240.13, 240.16
See application file for complete search history.

(56) References Cited

U.S. PATENT DOCUMENTS 5,657,086 A * 8/1997 Tahara et al. ............ 375/240.13
6,351,493 B1 * 2/2002 Reed et al. ............... 375/240.13

FOREIGN PATENT DOCUMENTS

EP 0 840 514 B1 9/2003
WO 2008/008331 A2 1/2008

OTHER PUBLICATIONS

Jianpeng Dong and Nam Ling, "Adaptive Intra Prediction Padding to Improve Intra Motion Compensation", Picture Coding Symposium, Apr. 24, 2006-Apr. 26, 2006, Beijing, XP030080231, 4 pages.
Mathias Wien et al, "Integer Transforms for H.26L Using Adaptive Block Transforms", Joint Video Team (JVT) of ISO/IEC MPEG & ITU-T VCEG (ISO/IEC JTCI/SC29/WG11 and ITU-T SG16 Q6), Document Q15k24, XP030003117, Portland, Oregon, Aug. 22-25, 2000, 5 pages.
PCT International Search Report dated Apr. 16, 2010 (PCT/US2009/063537) 4 pages.

* cited by examiner

*Primary Examiner* — Hosuk Song
(74) *Attorney, Agent, or Firm* — Harness, Dickey & Pierce, P.L.C.

(57) ABSTRACT

A video codec is provided in which virtual reference data (e.g., virtual reference blocks) are advantageously employed by a video coder and decoder to significantly improve coding efficiency as compared to prior art codecs. Specifically, a "virtual reference," as used herein, is defined as a group of pixels (e.g., a block) that is used as reference material for encoding portions of the video signal (e.g., a motion-compensated inter-predicted block), but that does not comprise or represent any portion of the actual video sequence to be displayed. For example, it may advantageously be determined that portions of the video sequence may be efficiently represented as a motion-compensated block of pixel values which are generated by the video coder based on the blocks being predicted but not based on any actual blocks in any of the actual video frames or slices.

28 Claims, 6 Drawing Sheets

METHOD AND APPARATUS FOR PERFORMING VIDEO CODING AND DECODING WITH USE OF VIRTUAL REFERENCE DATA

FIELD OF THE INVENTION

The present invention relates generally to the field of video compression and more particularly to an improved method and apparatus for performing block-based video coding and decoding.

BACKGROUND OF THE INVENTION

Most major standard video codecs (i.e., coders and decoders) achieve a data compression advantage over still image coding techniques by using a block-based, motion-compensated prediction scheme. Such schemes are fully familiar to those of ordinary skill in the art and include, for example, the well known video coding standards ITU-T/H.261, H.262, H.263, and H.264, and the corresponding ISO/IEC-11172 (MPEG-1), ISO/IEC 13818 (MPEG-2), ISO/IEC 14496 (MPEG-4/ASP), and ISO/IEC 14496-10 (MPEG-4/AVC).

Block-based schemes treat (typically rectangular) regions of pixels (i.e., picture elements) as a single unit, and typically encode such units using one of two broad methods. The first method is to independently code the block without reference to other blocks at all (i.e., "intra-coding"), or to code a block relative to some surrounding pixel values (i.e., "intra-prediction"). The second method is to code a block by providing a pointer to a similar, previously coded block which is used as a reference, and to further provide an error block that indicates the differences between the reference and the block to be coded (i.e., inter-coding). This latter method works extremely well because video frames tend to be very similar to other nearby video frames, with many of the changes therebetween due to portions of the scene moving between frames—hence, the term "motion-compensated prediction" is used to indicate that these reference block pointers are compensating for object or camera motion. Note that inter-coding is generally more efficient than intra-coding. (The efficiency of a codec in this context refers to the ability of a codec to represent an image with a minimum of distortion by using as few bits as possible.)

In recent years, many efficiency gains have been realized by providing increasingly better ways of specifying a reference block, including "bi-directional prediction," which uses multiple reference blocks (for example, one from a previous-in-time video frame and one from a future-in-time video frame—even though each of these video frames must necessarily have been previously decoded before the given video frame can be decoded), or by using variable size reference blocks. However, even with the best of the current video coding techniques, the bandwidth required for video transmission systems such as, for example, HDTV (High Definition Television), and for wireless video applications still exceeds the capabilities of these coding techniques and limits either the quality or the quantity of the resultant video.

SUMMARY OF THE INVENTION

We have recognized that there exist certain limitations in current video coding techniques which limit the possible efficiency thereof. The first such limitation is that the reference blocks used in current video coders must necessarily be part of a previously decoded video frame (which may, in fact, represent either a previous-in-time and/or a later-in-time video frame). That is, the reference block must necessarily be based on an actual part of the video as presented in an actual video frame. The second such limitation is that reference blocks must be updated en masse, as part of a slice or frame. (Those of ordinary skill in the art will recognize that a frame refers to a single still-image picture in a video sequence, whereas a "slice" simply refers to some subset of a frame.) That is, in many standard video codec implementations, such as H.264, the encoder can save multiple slices or frames to use as references, but ultimately, some finite limit is chosen to fix the storage required at the decoder.

In accordance with various illustrative embodiments of the present invention, a video codec is provided in which virtual reference data (e.g., virtual reference blocks) are advantageously employed by a video coder and decoder to significantly improve coding efficiency as compared to prior art codecs. Specifically, a "virtual reference," as used herein, is defined as a group of pixels (e.g., a block) that is used as reference material for encoding portions of the video signal (e.g., a motion-compensated inter-predicted block), but that does not comprise or represent any portion of the actual video sequence to be displayed. For example, it may advantageously be determined that portions of the video sequence may be efficiently represented as a motion-compensated block of pixel values which are generated by the video coder based on the blocks being predicted, but do not represent any actual block in any of the actual video frames or slices.

Specifically, an illustrative embodiment of the present invention provides a method and apparatus for generating an encoded video signal from an original video signal, the original video signal comprising a sequence of video frames, the encoded video signal for use in a subsequent video display of said original video signal, the method or apparatus comprising steps or machine-executable code for: generating virtual reference data based on a portion of the original video signal, wherein the generated virtual reference data does not represent any portion of any individual frame of the original video signal which is to be displayed in said subsequent video display thereof; encoding said generated virtual reference data and incorporating said encoded virtual reference data into the encoded video signal; incorporating into the encoded video signal an indication that said encoded virtual reference data incorporated therein comprises data which does not represent any portion of any individual frame of the original video signal to be displayed in said subsequent video display thereof; encoding one or more portions of the original video signal which are to be displayed in said subsequent video display thereof, wherein said encoding of said one or more portions of said original video signal which are to be displayed are based on and specifically reference a portion of said encoded virtual reference data; and incorporating said encoded portions of said original video signal which are to be displayed into said encoded video signal.

In addition, another illustrative embodiment of the present invention provides a method and apparatus for decoding an encoded video signal to generate a decoded video signal for use in a subsequent video display of an original video signal, the original video signal comprising a sequence of video frames, the encoded video signal having been generated from the original video signal, the method or apparatus comprising steps or machine-executable code for: identifying in said encoded video signal an indication that encoded virtual reference data has been incorporated therein, wherein said encoded virtual reference data does not represent any portion of any individual frame of the original video signal which is to be displayed in said subsequent video display thereof; decoding from said encoded video signal said encoded virtual reference data incorporated therein; and decoding from said encoded video signal one or more encoded portions of the original video signal which are to be displayed in said subsequent video display thereof, wherein said encoded portions of said original video signal which are to be displayed are based on and specifically reference a portion of said encoded virtual reference data.

DETAILED DESCRIPTION OF THE PREFERRED EMBODIMENTS

Introduction

Figure 1:
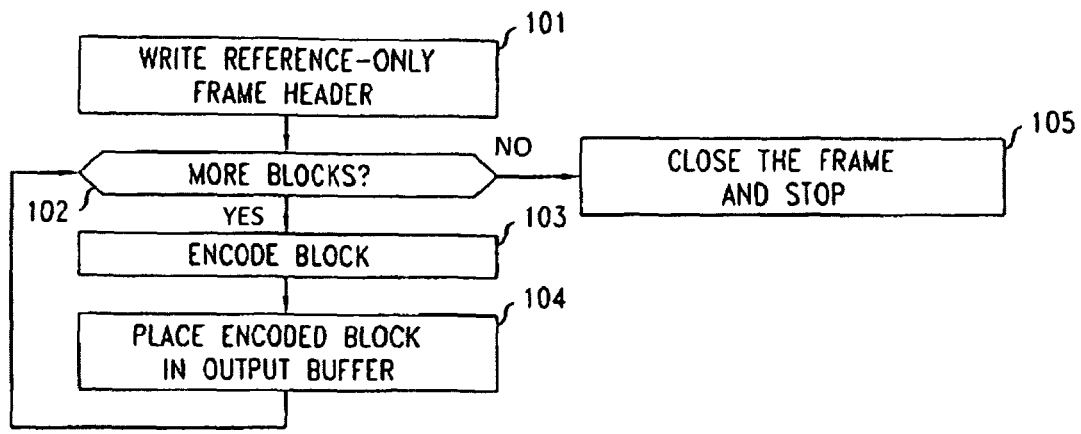
FIG. 1 shows a flow chart of a method of encoding a video signal with use of virtual reference data in accordance with a first illustrative embodiment of the present invention.

To clarify the operation of the illustrative embodiments described in detail below, consider the advantage of encoding a virtual reference in terms of minimizing encoded bits. Note first that typical state-of-the-art encoders represent blocks to be encoded in terms of previously encoded frames (or slices) by specifying the error between a pointed-to reference block and the block to be encoded. This error is typically encoded using entropy coding (which is fully familiar to those of ordinary skill in the art) or some similar method that reduces the required number of bits (typically to less than one bit of error per pixel).

In the H.264 standard encoder, for example, the Context-Adaptive Variable Length Coding (CAVLC) entropy coder (which is also familiar to those skilled in the art) is used as a lossless compression method well suited for block-based video coding. In a typical case, the error is a quantized difference between the discrete cosine transform (DCT) coefficients of the predicted pixels and the DCT coefficients of the actual pixels. (The use of DCT coefficients in video coding is also fully familiar to those of ordinary skill in the art.) In general, the encoding is more efficient if there are many differences which are equal to zero, but it is still highly efficient if the (absolute value of the) difference of select non-zero terms is equal to 1. An occasional absolute difference greater than 1 in these select terms breaks the efficiency of the entropy coder and requires a disproportionately large number of bits to encode.

Consider, for example, the case where one of these select terms is equal to 2. In the H.264 coder, for example, one would need to either accept the cost of coding the additional bits, distort the video by changing the absolute error to a 0 or a 1, or increase the quantization level of the error by, for example, dividing by 2 (which is identical to dropping the least significant bit of the error) so that the offending value of a 2 becomes a 1, and (unfortunately) all the previous 1 values become 0 values. Adopting the first choice is to accept lower efficiency, and adopting either the second or the third choices is to increase the distortion (i.e., to decrease the quality of the resultant video). This creates a classic trade-off between bit-rate versus quality in a video codec. In summary, two blocks are sent (a first block for the previously encoded frame or slice, and a second block for the frame or slice being coded, inter alia in terms of the previously encoded frame or slice), but the second block may be coded in a less efficient manner than is, in theory, possible.

In accordance with the principles of the present invention, and in accordance with various illustrative embodiments thereof, the coding efficiency associated with the above example could be significantly improved by sending virtual reference data having the term in question set one bit higher than in the first block above. Thus, the first block above could advantageously use the virtual reference data with a −1 "error" (i.e., the value of the term in question in the first block would be one less than the value specified in the virtual reference data), and the second block above could advantageously use the virtual reference data with a +1 "error" (i.e., the value of the term in question in the second block would be one more than the value specified in the virtual reference data). In this case, a virtual block is sent, and two regular (i.e., "real") blocks (i.e., the first block above and the second block above) are also sent. The net coding, however, will be more efficient in many cases, since the virtual block can be carefully tuned to minimize the "error" values for the two "real" blocks. Effectively, although the coding of the virtual block and first regular block are likely to slightly exceed (in bits required) the coding of the first block for a prior art coder such as H.264, the second regular block is likely to be coded at such a better efficiency that there is a net reduction in the total number of required bits.

A First Illustrative Embodiment of the Present Invention

In accordance with a first illustrative embodiment of the present invention, an entire frame (or slice) of virtual reference blocks is advantageously coded and transmitted in the coded bit stream to the decoder. These coded virtual reference blocks are then advantageously decoded and stored for future use as reference blocks, without ever being displayed as part of the output video (since they do not represent any part of the actual video signal itself). The coding of the virtual reference material may be otherwise identical to normal codec operation, with intra-coded blocks ("I-blocks"), bi-directionallycoded blocks ("B-blocks"), and predictive-coded ("P-blocks") each used where appropriate (i.e., where most advantageous).

In particular, in accordance with the principles of the present invention, the virtual reference blocks are advantageously generated in such a manner so as to maximize the overall efficiency of the codec, whereas prior art encoders must necessarily choose reference blocks from existing blocks (i.e., blocks which represent an actual portion of the video). One method for generating virtual reference blocks in accordance with an illustrative embodiment of the present invention is described below in connection with FIG. 9 herein.

FIG. 1 shows a flow chart of a method of encoding a video signal with use of virtual reference data in accordance with the first illustrative embodiment of the present invention. Flowchart box 101 writes a frame (or slice) header indicating that this is a virtual reference frame (or slice). Flowchart box 102 decides whether there are more video blocks in the virtual reference frame (or slice) to be encoded. If so, flowchart box 103 encodes a next video block, flowchart box 104 places the encoded video block in an output buffer, and control proceeds back to flowchart box 102. If not, flowchart box 105 closes the frame (or slice) and the flow terminates. In this manner, one or more virtual reference blocks have been advantageously generated and encoded for subsequent use in, for example, the predictive coding of actual video blocks by the encoder.

Figure 2:
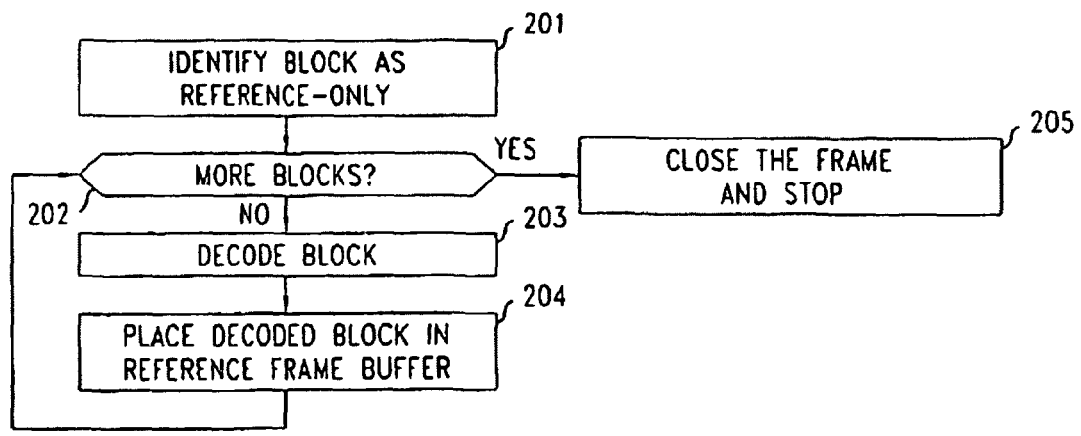
FIG. 2 shows a flow chart of a method of decoding an encoded video signal with use of virtual reference data in accordance with a first illustrative embodiment of the present invention.

FIG. 2 shows a flow chart of a method of decoding an encoded video signal with use of virtual reference data in accordance with the first illustrative embodiment of the present invention. Flowchart box 201 identifies that the frame (or slice) to be decoded is a virtual reference (only) frame (or slice). Flowchart box 202 decides whether there are more blocks to be decoded. If so, flowchart box 203 decodes a next video block, flowchart box 204 places the video block directly in a reference frame buffer, and control proceeds back to flowchart box 202. If not, flowchart box 205 closes the frame (or slice) and flow terminates. In this manner, one or more virtual reference blocks have been advantageously decoded and stored for subsequent use in, for example, the predictive decoding of actual video blocks by the decoder.

A Second Illustrative Embodiment of the Present Invention

In accordance with a second illustrative embodiment of the present invention, what will be referred to herein as "Dual blocks" or D-blocks" are introduced. As defined herein, a D-block is advantageously composed of three parts: a header, a primary block and a secondary block. The header is a flag indicating the type of reference to follow. For example, if the header is a "DBLOCK_NO" flag (which may, for example, be represented by a 0 bit), it indicates that there is no virtual reference block, which therefore indicates a conventional encoding. In this case the flag may be merely removed by the decoder, and the block may be decoded as it is in conventional decoders (e.g., as an I-block, a P-block, or a B-block). If, on the other hand, the header is a "DBLOCK_YES" flag (which may, for example, be represented by a 1 bit), it indicates that two blocks will be encoded (and will immediate follow the header). First, what will be referred to herein as the "primary" block will be encoded in the bits immediately following the initial flag, and this will advantageously comprise the encoding of a virtual reference block. Following the encoding of the virtual reference block will be an encoding of what will be referred to herein as the "secondary" block, which will comprise an encoding of the actual block representing the current location in the video (i.e., a "normal video block" in a conventional coder). Either of the two blocks (i.e., the primary block and the secondary block) may be an I-block, a P-block, or a B-block, independent of one another. In particular, the secondary block may advantageously be coded as a P-block or a B-block which references (i.e., depends upon) the primary (virtual reference) block.

Figure 3:
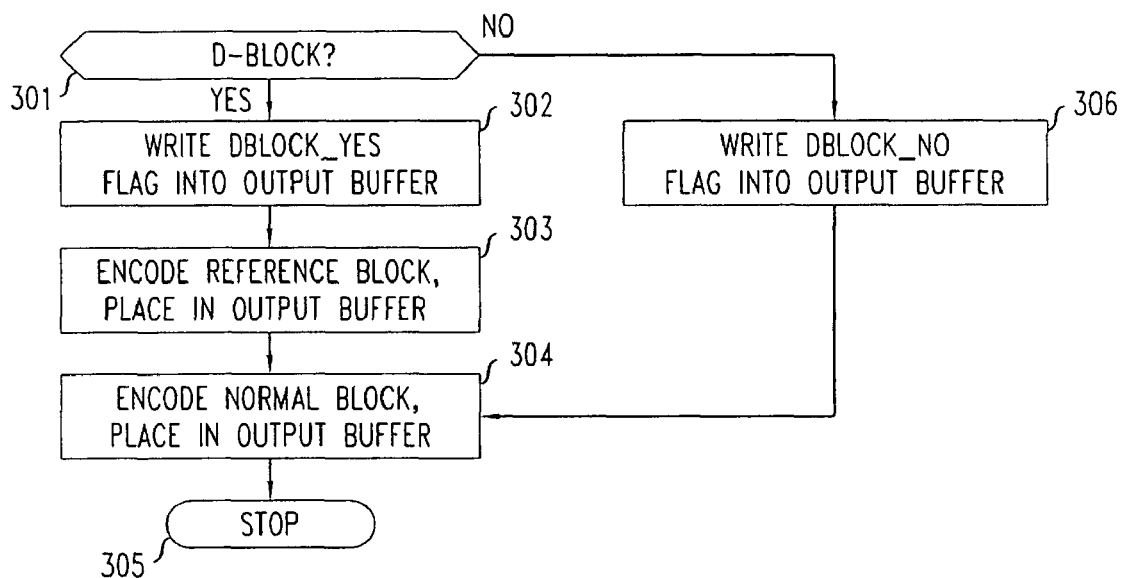
FIG. 3 shows a flow chart of a method of encoding a video signal with use of virtual reference data in accordance with a second illustrative embodiment of the present invention.

FIG. 3 shows a flow chart of a method of encoding a video signal with use of virtual reference data in accordance with the second illustrative embodiment of the present invention. Flowchart box 301 determines whether the video block should be represented as a D-block. If it is advantageous to do so, flowchart box 302 writes a DBLOCK_YES flag into the output buffer as the header. Flowchart box 303 then encodes a virtual reference video block and writes it into the output buffer. Flowchart box 304 encodes a normal (i.e., actual) video block and writes it into the output buffer, and flow terminates at flowchart box 305. Advantageously, the normal video block may be encoded with reference to the virtual reference video block encoded in flowchart box 303. If flowchart box 301 determines that it is not advantageous to represent the video block as a D-block, flowchart box 306 writes a DBLOCK_NO flag into the output buffer as the header, and flow proceeds to flowchart box 304 to encode the video block in a conventional manner.

Figure 4:
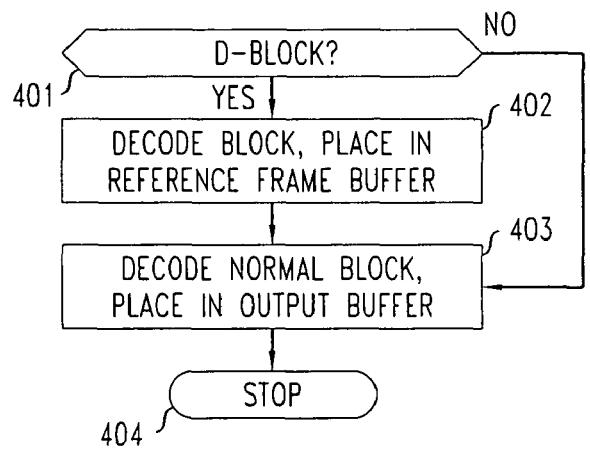
FIG. 4 shows a flow chart of a method of decoding an encoded video signal with use of virtual reference data in accordance with a second illustrative embodiment of the present invention.

FIG. 4 shows a flow chart of a method of decoding an encoded video signal with use of virtual reference data in accordance with the second illustrative embodiment of the present invention. Flowchart box 401 examines the DBLOCK flag in the header of the encoded data for the video block. If the flag is equal to DBLOCK_YES, flowchart box 402 decodes the first (primary) video block, which comprises a virtual reference block, and writes the decoded virtual reference block directly into the reference frame buffer. Flowchart box 403 then decodes the next (secondary) video block, which represents the actual video block to be displayed, and writes the decoded video block directly into a video frame output buffer. Flow then terminates at flowchart box 404. If, on the other hand, the flag from flowchart box 401 is equal to DBLOCK_NO, flow proceeds directly to flowchart box 403 where the (actual) video block is decoded and written to the video frame output buffer.

A Third Illustrative Embodiment of the Present Invention

In accordance with a third illustrative embodiment of the present invention, the virtual reference block embedded in the D-block in accordance with the second illustrative embodiment of the present invention (as described above) advantageously contains an additional motion vector to place (i.e., locate within the frame or slice) the primary block. In accordance with this third illustrative embodiment, this may be indicated by an extended header. For example, following a DBLOCK_YES flag (see above), a DBLOCK_RELOCATED_YES flag may be used to indicate that a D-block is to be relocated, whereas a DBLOCK_RELOCATED_NO flag may be used to indicate no such relocation (and thus, the scheme as described above in connection with the second illustrative embodiment of the present invention). Note that a leading DBLOCK_NO may be advantageously handled in an identical manner as is described above in connection with the second illustrative embodiment of the present invention, and is advantageously not followed by the extended header.

When the DBLOCK_RELOCATED_YES flag is present, the first motion vector of the secondary block may be advantageously used to relocate the primary virtual reference block, and the secondary block must therefore be either a P-block or a B-block. For example, a secondary P-block following an extended header may be advantageously parsed to decode the motion vector, and the decoded motion vector may then be advantageously applied to the primary block, such that the primary block is decoded and then replaces the block pointed to by the motion vector.

Note that an encoder will advantageously employ either the technique of the second illustrative embodiment of the present invention or the technique of the third illustrative embodiment of the present invention at any given time, since the second header bit needs to be properly interpreted by the corresponding decoder. In accordance with various illustrative embodiments of the invention, this may be achieved by (a) only using one of these two techniques throughout the encoding of the entire video signal; (b) updating in a frame (or slice) header information specifying which of the techniques (i.e., "modes") is to be used until a subsequent such update is provided; or (c) switching between modes using some parameter setting sequence in the syntax of the coder.

Figure 5:
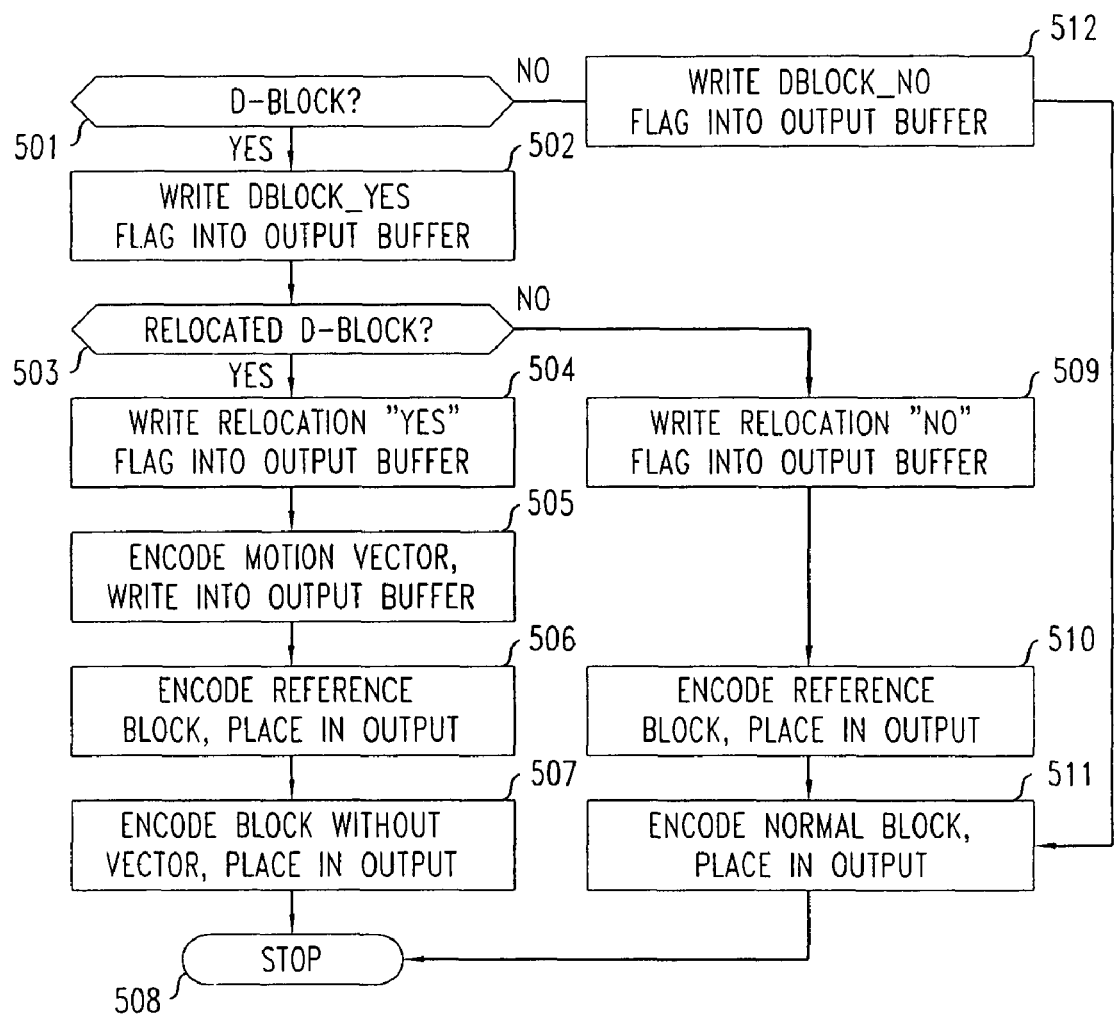
FIG. 5 shows a flow chart of a method of encoding a video signal with use of virtual reference data in accordance with a third illustrative embodiment of the present invention.

FIG. 5 shows a flow chart of a method of encoding a video signal with use of virtual reference data in accordance with the third illustrative embodiment of the present invention. First, flowchart box 501 determines whether the video block should be represented as a D-block. If it is advantageous to do so, flowchart box 502 writes a DBLOCK_YES flag into the output buffer, and then, flowchart box 503 determines whether it is advantageous for the video block to be a relocated D-block. If it is, flowchart box 504 writes a DBLOCK_RELOCATED_YES flag into the output buffer, and flowchart box 505 encodes an appropriate motion vector and writes it into the output buffer. (The motion vector may be determined with use of conventional motion-compensation techniques fully familiar to those of ordinary skill in the art.) Then, flowchart box 506 encodes a virtual reference block and writes it to the output buffer, and flowchart box 507 encodes the (actual) video block, omitting the motion vector for the P-block or the first motion vector of a B-block, which is now advantageously assumed to be the motion vector from flowchart box 505 (i.e., the motion vector from the virtual reference block). Flow terminates at flowchart box 508.

If, however, flowchart box 503 determines that the video block should not be a relocated D-block, then flowchart box 509 writes a DBLOCK_RELOCATED_NO flag into the output buffer. Flowchart box 510 then encodes the virtual reference block and places it in the output buffer, and flowchart box 511 encodes the normal block and places it in the output buffer as well. Flow is then terminated at flowchart box 508. Finally, if flowchart box 501 had determined that the video block should not be a D-block, then flowchart box 512 writes a DBLOCK_NO flag into the output buffer, and flow proceeds to flowchart box 511 to encode the normal block and place it in the output buffer. In accordance with an alternative illustrative embodiment of the present invention, all video blocks in flowchart box 507 may be encoded normally, without the encoder making any assumptions about the inter-coded blocks pointing to the virtual reference block encoded in flowchart box 506.

Figure 6:
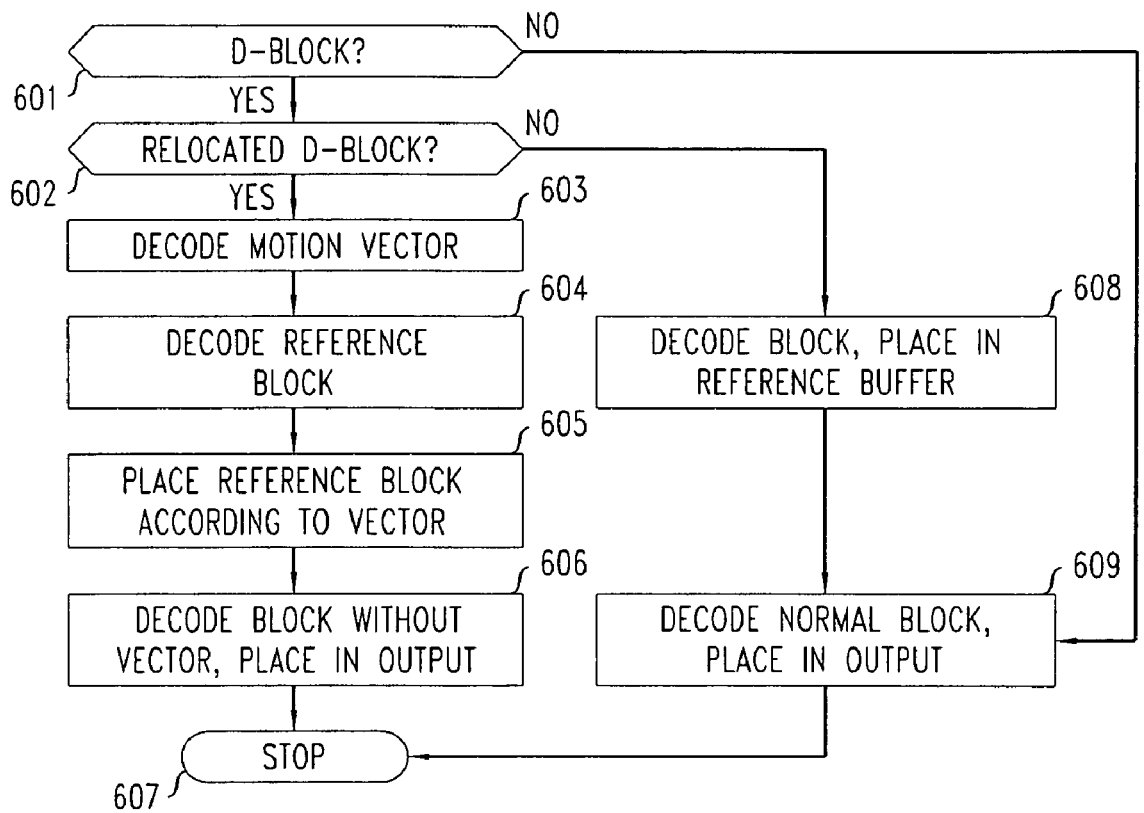
FIG. 6 shows a flow chart of a method of decoding an encoded video signal with use of virtual reference data in accordance with a third illustrative embodiment of the present invention.

FIG. 6 shows a flow chart of a method of decoding an encoded video signal with use of virtual reference data in accordance with the third illustrative embodiment of the present invention. Flowchart box 601 examines the DBLOCK flag in the video block. If the flag is determined to be DBLOCK_YES, flowchart box 602 examines the DBLOCK_RELOCATED flag in the video block. If the flag is determined to be DBLOCK_RELOCTED_YES, then flowchart box 603 decodes the provided motion vector and flowchart box 604 decodes the provided virtual reference block. Flowchart box 605 then places the virtual reference block in the reference frame and location as indicated by the motion vector decoded in flowchart box 603, and flowchart box 606 then decodes the provided (actual) video block without use of a motion vector. As indicated above, if the video block is an inter-coded block, the first motion vector is advantageously assumed to be the block decoded in flowchart box 603 (i.e., the virtual reference block is the virtual reference block decoded in flowchart box 604). Flowchart box 606 also advantageously writes the decoded (actual) video block directly into a video frame output buffer, and then flow terminates at flowchart box 607.

If, on the other hand, the DBLOCK_RELOCATED flag is determined in flowchart box 602 to be DBLOCK_RELOCATED_NO, flow proceeds to flowchart box 608 which decodes a virtual reference block and places it in the reference buffer. Flow then proceeds to flowchart box 609, which decodes a (normal) video block and places it in the output buffer. If, however, flowchart box 601 had determined that the DBLOCK flag in the video block is DBLOCK_NO, then flow would have proceeded directly to flowchart box 609 for the decoding of a (normal) video block. In accordance with an alternative illustrative embodiment of the present invention corresponding to the alternative illustrative embodiment described above in connection with the illustrative encoder of FIG. 5, all video blocks in flowchart box 606 may be decoded normally, with the decoder making no assumptions about the inter-coded blocks pointing to the reference from flowchart box 603.

A Fourth Illustrative Embodiment of the Present Invention

In accordance with a fourth illustrative embodiment of the present invention, intra-coding prediction modes, such as those employed by the H.264 standard codec (which is fully familiar to those of ordinary skill in the art) are advantageously modified. That is, whereas the previously described illustrative embodiments of the present invention have employed virtual reference data (i.e., virtual reference blocks) advantageously used in certain inter-coding prediction modes, this fourth illustrative embodiment employs virtual reference data which are advantageously used in certain intra-coding prediction modes. Note that the intra-coding prediction modes of the H.264 standard codec are fully familiar to those of ordinary skill in the art.

In particular, these intra-coding prediction modes function in a manner similar to that of inter-prediction modes such as motion compensation, but rather than using video blocks from other frames (or slices), added to an error block, to predict a video block to be coded, they use the values of surrounding pixels from other blocks in the same frame (or slice), added to an error block, to predict the video block to be coded. The surrounding pixels may, for example, comprise the column of pixels to the left of the block to be decoded, the row of pixels above the block to be coded, or a number of other such possibilities. In the H.264 standard codec, for example, there are eight such intra-coding prediction modes in total.

In accordance with this fourth illustrative embodiment of the present invention, the pixels used in a given prediction mode are advantageously encoded in the primary block of a D-block, such as is described in connection with the second illustrative embodiment of the present invention. (See above.) The specific prediction mode used in encoding a given block, which is conventionally specified in an intra-prediction block, is, in accordance with this fourth illustrative embodiment of the present invention, advantageously specified in the secondary block of the D-block. Note that the primary block need not be saved, since it is used only for the current block. The intra-coded pixels may be advantageously and efficiently encoded using standard methods, such as differential encoding, fully familiar to those of ordinary skill in the art.

Figure 7:
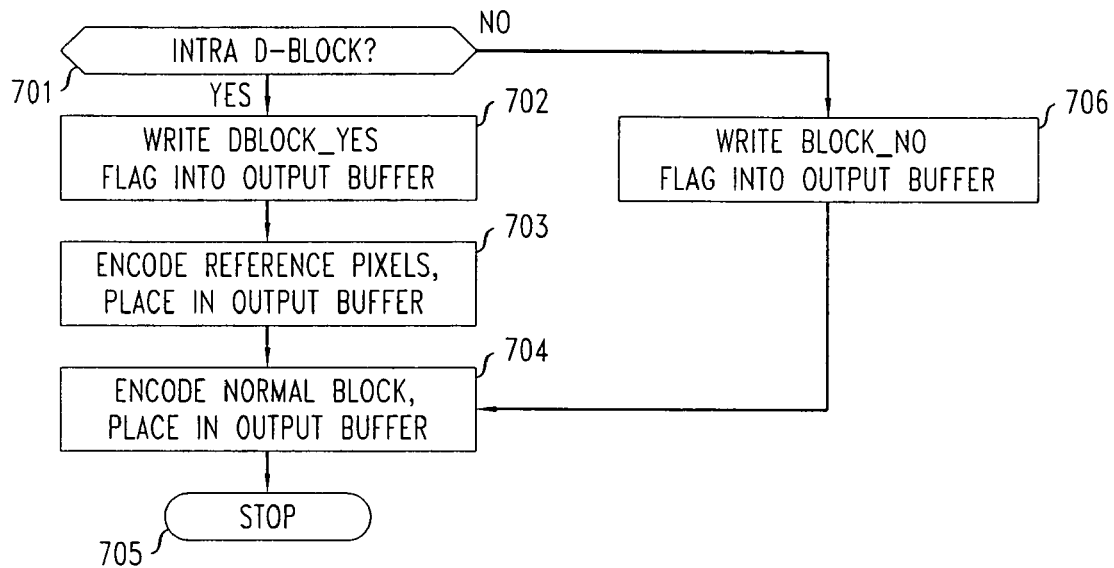
FIG. 7 shows a flow chart of a method of encoding a video signal with use of virtual reference data in accordance with a fourth illustrative embodiment of the present invention.

FIG. 7 shows a flow chart of a method of encoding a video signal with use of virtual reference data in accordance with the fourth illustrative embodiment of the present invention. Flowchart box 701 determines whether it would be advantageous to represent the current video block as an intra-predicted D-block. If so, flowchart box 702 writes a DBLOCK_YES flag into the output buffer and flowchart box 703 encodes virtual reference pixels and writes them into the output buffer. Flowchart box 704 then encodes the (normal) video block as an intra-predicted block using these virtual reference pixels, and writes the encoded video block into the output buffer. Flow terminates at flowchart box 705. If, on the other hand, flowchart box 701 determines that the current video block should not be represented as an intra-predicted D-block, flowchart box 706 writes a DBLOCK_NO flag into the output buffer, and flow proceeds to flowchart box 704, where the (normal) block is encoded and written into the output buffer in a conventional manner.

Figure 8:
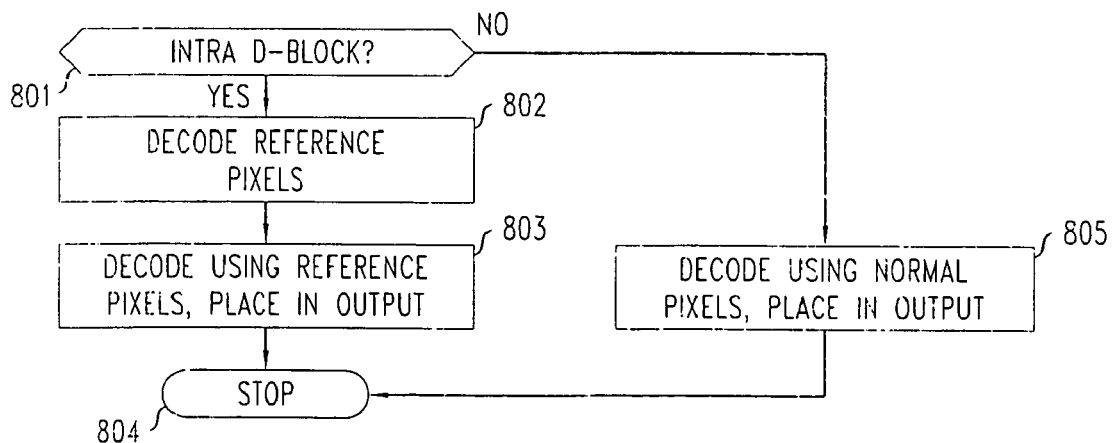
FIG. 8 shows a flow chart of a method of decoding an encoded video signal with use of virtual reference data in accordance with a fourth illustrative embodiment of the present invention.

FIG. 8 shows a flow chart of a method of decoding an encoded video signal with use of virtual reference data in accordance with the fourth illustrative embodiment of the present invention. Flowchart box 801 examines the DBLOCK flag in the encoded video block. If the flag is determined to be DBLOCK_YES, flowchart box 802 decodes the provided set of virtual reference pixels. Flowchart box 803 then decodes the current video block using the virtual reference pixels, and writes the video block directly into a video frame output buffer. Flow then terminates at flowchart box 804. If, on the other hand, the flag from flowchart box 801 is determined to be DBLOCK_NO, flow proceeds directly to flowchart box 805, which decodes the block using reference pixels in a conventional manner. Flow then terminates at flowchart box 804.

Note that in accordance with various additional illustrative embodiments of the present invention, it may be advantageous to mix the techniques of the second illustrative embodiment described above, the third illustrative embodiment described above, and the fourth illustrative embodiment described above, by judiciously inspecting the primary and secondary blocks, and based thereupon, determining the which coding and decoding techniques are to be employed. Such judicious mixtures will be obvious to those skilled in the art based upon the disclosure provided herein.

An Illustrative Method for Selecting Coefficient Values in Virtual Blocks

Figure 9:
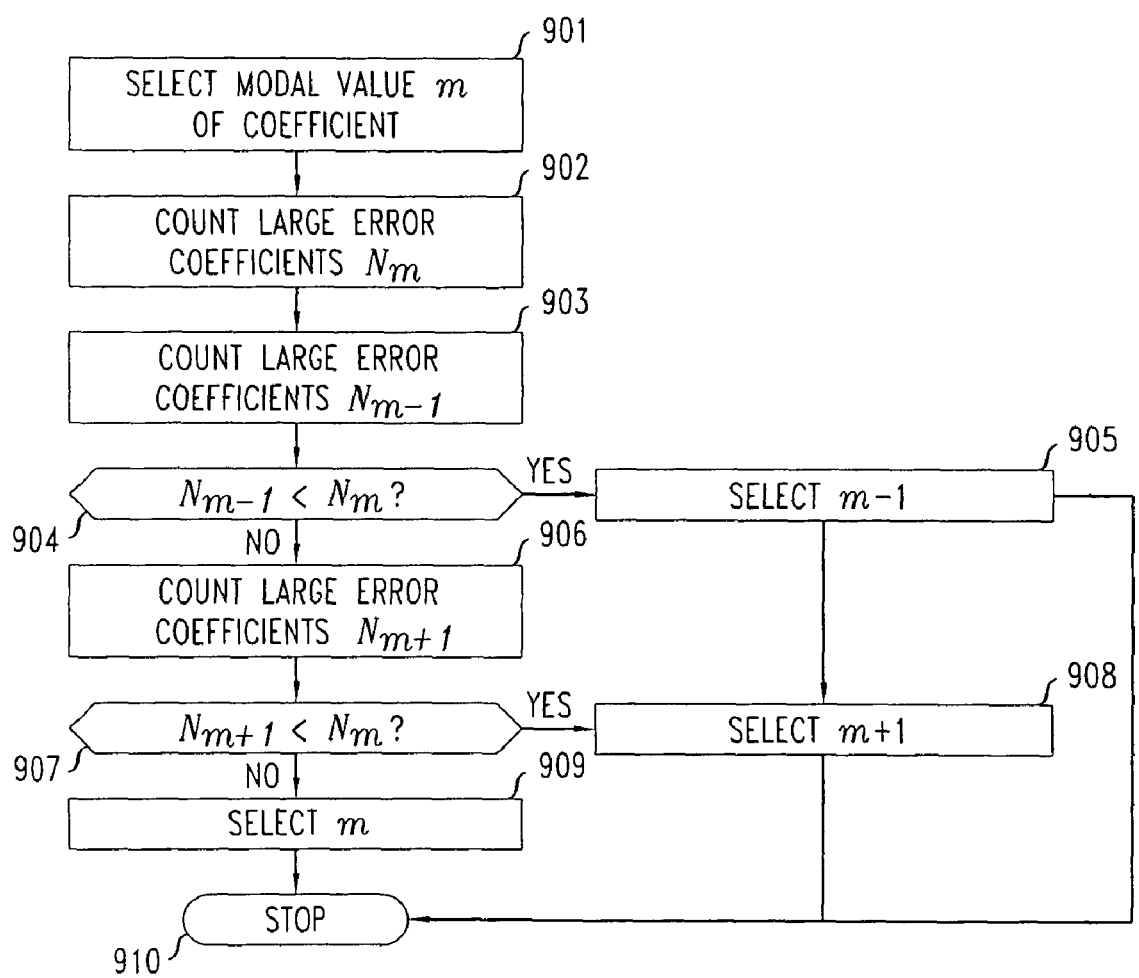
FIG. 9 shows a flow chart of an illustrative method for generating coefficient values, which may be employed in connection with various ones of the methods of encoding a video signal with use of virtual reference data in accordance with various illustrative embodiments of the present invention.

FIG. 9 shows a flow chart of an illustrative method for generating frequency transform coefficient values, which may be employed in connection with various ones of the methods of encoding a video signal with use of virtual reference data in accordance with various illustrative embodiments of the present invention. (The use of frequency transform coefficients for coding video signals is fully familiar to those of ordinary skill in the art.) In particular, the figure shows an illustrative method which may be employed for generating a virtual reference block for use in the above-referenced illustrative embodiments of the invention. More specifically, a block of coefficient values—for example, DCT (Discrete Cosine Transform) or similar coefficients, fully familiar to those of ordinary skill in the art—may be generated by the illustrative method of FIG. 9 and then used as the data for a virtual reference block in accordance with, for example, the illustrative encoding methods shown in FIGS. 1, 3 and 5.

Specifically, block encoding in accordance with the illustrative method of FIG. 9 proceeds as follows: A DCT or similar block transform employed by the codec is advantageously performed on an N×M block of pixels, where, for example, N=M=16. Such a step is specified in essentially all conventional MPEG and ITU block-based video codecs, and is fully familiar to those of ordinary skill in the art. This process is typically performed on a "Group of Pictures" (GOP), which is defined in conventional codecs as a set of frames (or slices) that are to be independently encoded without reference to any content outside the GOP. (Use of a GOP is also fully familiar to those of ordinary skill in the art). Conventional motion search procedures, implemented in essentially all such conventional encoders, can be then used to determine which coefficients belong to a "family", where a family is defined as a group of coefficients that move throughout at least some section of the GOP. (Note that, in terms of the images being encoded, this typically refers to a real-world object that is captured moving across the images, or that moves due to camera motion.) In accordance with certain illustrative embodiments of the present invention, a virtual reference block will be advantageously used to represent such a family. Ideally, the virtual reference block will have coefficients that minimize the total error of the P-blocks referencing it, in combination with the total encoded size of itself, and will be advantageously placed in the reference frame so as to minimize the encoded number of bits for all motion vectors pointing to that virtual reference block. A practical method for generating a virtual reference block which meets or is close to such an ideal in most cases is advantageously provided by the illustrative method shown in FIG. 9.

Specifically, as shown in FIG. 9, flowchart box 901 first selects the lowest modal value m—that is, if there is more than one mode, the lowest value is selected. (A "mode" of a set of values is defined in statistics theory to be a value which occurs most frequently in the set.) Using this number, m, will thereby result in the largest possible number of "0" entries in subsequent error blocks. However, in practice, the actual distribution of values in a set of transform coefficients representing a video block is often close to bimodal or is skewed, and therefore, using such a modal value may not always be optimal in reducing the total number of coefficients having an error with an absolute value less than or equal to 1 (i.e., "small error" coefficients, as opposed to "large error" coefficients having an error with an absolute value greater than 1).

Thus, next, in flowchart box 902, $N_m$, which is defined herein to be the total number of large error coefficients (i.e., those having an error with an absolute value greater than 1) assuming the use of the selected modal value m, is determined (i.e., counted). Flowchart box 903 then computes $N_{m-1}$, which is defined herein to be the total number of large error coefficients assuming instead the use of a value of one less than the previously determined modal value—namely, using m−1 instead of m. Then, in flowchart box 904, $N_{m-1}$ and $N_m$ are compared, and if $N_{m-1}$ is less than $N_m$, then flow proceeds to flowchart box 905, in which the value m−1 is selected and flow proceeds to flowchart box 910 where the process stops.

Otherwise (i.e., if $N_{m-1}$ is not less than $N_m$), flow proceeds to flowchart box 906, which computes $N_{m+1}$, which is defined herein to be the total number of large error coefficients assuming the use of a value of one above the previously determined modal value—namely, using m+1 instead of m (or m−1).

Next, in flowchart box 907, $N_{m+1}$ is compared to $N_m$, and if $N_{m+1}$ is less than $N_m$, then flow proceeds to flowchart box 908 in which the value m+1 is selected and flow proceeds to flowchart box 910 where the process stops. Otherwise (i.e., if $N_{m+1}$ is not less than $N_m$), flowchart box 909 selects the originally determined modal value m, and again, flow proceeds to flowchart box 910 where the process stops.

Once all of the coefficients are selected, the block is advantageously placed in the virtual frame at a location that is the approximate average of its location through the frames. Since the blocks are allocated to non-overlapping places, the virtual frame is divided into a plurality of N×M sections, and so the virtual block may be advantageously placed in the closest one of these sections. If, however, the closet one of these sections is occupied, the block may instead be placed in one of the nearby open sections.

Illustrative Embodiments Comprising a Video Encoder or a Video Decoder

In accordance with various illustrative embodiments of the present invention, video encoders and video decoders may be advantageously implemented using machine-executable code which implement the principles of the present invention. For example, the above-described illustrative methods may be physically embodied in machine-executable code which may then be incorporated into an otherwise conventional memory, and such executable code may then be executed by a conventional associated processor. As used herein, the term "memory" is used without limitation and may comprise any type of data storage device which may hold machine-executable code, including, for example, read-only memory (ROM), random access memory (RAM), mass storage devices (such as, for example, a disc), etc. Similarly, as used herein, the term "processor" is used without limitation and may comprise any device capable of executing program code supplied thereto in any possible manner.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

What is claimed is:

1. A method for generating an encoded video signal from an original video signal, the original video signal comprising a sequence of video frames, the encoded video signal for use in a subsequent video display of said original video signal, the method comprising the steps of:

generating virtual reference data based on a portion of the original video signal, wherein the generated virtual reference data does not represent any portion of any individual frame of the original video signal which is to be displayed in said subsequent video display thereof;

encoding, using a processor, said generated virtual reference data and incorporating said encoded virtual reference data into the encoded video signal;

incorporating into the encoded video signal an indication that said encoded virtual reference data incorporated therein comprises data which does not represent any portion of any individual frame of the original video signal to be displayed in said subsequent video display thereof;

encoding, using a processor, one or more portions of the original video signal which are to be displayed in said subsequent video display thereof, wherein said encoding of said one or more portions of said original video signal which are to be displayed are based on and specifically reference a portion of said encoded virtual reference data; and incorporating said encoded portions of said original video signal which are to be displayed into said encoded video signal.

2. The method of claim 1 wherein said encoded video signal comprises a block-based encoding of said original video signal, wherein said virtual reference data comprises one or more virtual reference blocks, and wherein said encoded portions of said original video signal which are to be displayed are encoded based on said encoded virtual reference data with use of a block-based motion compensated prediction scheme.

3. The method of claim 2 wherein the step of generating the virtual reference data comprises:

identifying a set of video blocks comprising a video block from each of a plurality of video frames represented by said original video signal; and generating the virtual reference data so as to minimize differences between said identified video blocks and the generated virtual reference data.

4. The method of claim 3 wherein the generated virtual reference data comprises block transform coefficient values, and wherein the step of generating the virtual reference data comprises the step of determining a plurality of modal coefficient values based on said set of identified video blocks for use as said virtual reference data.

5. The method of claim 4 wherein the step of generating the virtual reference data further comprises the step of modifying the plurality of modal coefficient values based on a corresponding plurality of counts of coefficient values whose absolute difference from said corresponding modal coefficient values exceeds one.

6. The method of claim 2 wherein said encoded virtual reference data and one encoded portion of said original video signal which is to be displayed are incorporated into said encoded video signal together as an encoded dual block.

7. The method of claim 6 wherein the encoded dual block further comprises a motion vector representative of a relocation within a video frame that is to be associated with the encoded virtual reference data incorporated in the encoded dual block.

8. The method of claim 1 wherein the encoded video signal comprises a block-based encoding of said original video signal, wherein one of said portions of the original video signal which is to be displayed is comprised in a given frame of said original video signal, wherein said virtual reference data is generated based on said given frame of said original video signal, and wherein said one of said portions of the original video signal which is to be displayed is encoded based on said encoded virtual reference data with use of an intra-coding prediction scheme.

9. A method for decoding an encoded video signal to generate a decoded video signal for use in a subsequent video display of an original video signal, the original video signal comprising a sequence of video frames, the encoded video signal having been generated from the original video signal, the method comprising the steps of:
identifying in said encoded video signal an indication that encoded virtual reference data has been incorporated therein, wherein said encoded virtual reference data does not represent any portion of any individual frame of the original video signal which is to be displayed in said subsequent video display thereof;
decoding, using a processor, from said encoded video signal said encoded virtual reference data incorporated therein; and
decoding, using a processor, from said encoded video signal one or more encoded portions of the original video signal which are to be displayed in said subsequent video display thereof, wherein said encoded portions of said original video signal which are to be displayed are based on and specifically reference a portion of said encoded virtual reference data.

10. The method of claim 9 wherein said encoded video signal comprises a block-based encoding of said original video signal, wherein said encoded virtual reference data comprises one or more encoded virtual reference blocks, wherein said encoded portions of said original video signal which are to be displayed are based on said encoded virtual reference data and have been encoded with use of a block-based motion compensated prediction scheme, and wherein the step of decoding from said encoded video signal said one or more encoded portions of the original video signal which are to be displayed comprises performing block-based motion compensation on the decoded virtual reference data.

11. The method of claim 9 further comprising the step of storing said decoded virtual reference data in a reference frame buffer.

12. The method of claim 10 wherein said encoded virtual reference data and one encoded portion of said original video signal which is to be displayed have been incorporated into said encoded video signal together as an encoded dual block.

13. The method of claim 12 wherein the encoded dual block further comprises a motion vector representative of a relocation within a video frame that is to be associated with the encoded virtual reference data incorporated in the encoded dual block, and wherein the method further comprises the step of relocating the decoded virtual reference data based upon said motion vector.

14. The method of claim 9 wherein the encoded video signal comprises a block-based encoding of said original video signal, wherein one of said encoded portions of the original video signal which is to be displayed is comprised in a given frame of said original video signal, wherein said virtual reference data has been generated based on said given frame of said original video signal, and wherein said one of said encoded portions of the original video signal which is to be displayed has been encoded based on said encoded virtual reference data with use of an intra-coding prediction scheme.

15. A video encoder configured to generate an encoded video signal from an original video signal, the original video signal comprising a sequence of video frames, the encoded video signal for use in a subsequent video display of said original video signal, the video encoder comprising:

a processor and a memory, the memory including machine-executable code which when executed configures the processor to,
generate virtual reference data based on a portion of the original video signal, wherein the generated virtual reference data does not represent any portion of any individual frame of the original video signal which is to be displayed in said subsequent video display thereof;
encode said generated virtual reference data and incorporating said encoded virtual reference data into the encoded video signal;
incorporate into the encoded video signal an indication that said encoded virtual reference data incorporated therein comprises data which does not represent any portion of any individual frame of the original video signal to be displayed in said subsequent video display thereof;
encode one or more portions of the original video signal which are to be displayed in said subsequent video display thereof, wherein said encoding of said one or more portions of said original video signal which are to be displayed are based on and specifically reference a portion of said encoded virtual reference data; and
incorporate said encoded portions of said original video signal which are to be displayed into said encoded video signal.

16. The video encoder of claim 15 wherein said encoded video signal comprises a block-based encoding of said original video signal, wherein said virtual reference data comprises one or more virtual reference blocks, and wherein said encoded portions of said original video signal which are to be displayed are encoded based on said encoded virtual reference data with use of a block-based motion compensated prediction scheme.

17. The video encoder of claim 16 wherein generating the virtual reference data comprises:
identifying a set of video blocks comprising a video block from each of a plurality of video frames represented by said original video signal; and
generating the virtual reference data so as to minimize differences between said identified video blocks and the generated virtual reference data.

18. The video encoder of claim 17 wherein the generated virtual reference data comprises block transform coefficient values, and wherein generating the virtual reference data comprises determining a plurality of modal coefficient values based on said set of identified video blocks for use as said virtual reference data.

19. The video encoder of claim 18 wherein generating the virtual reference data further comprises modifying the plurality of modal coefficient values based on a corresponding plurality of counts of coefficient values whose absolute difference from said corresponding modal coefficient values exceeds one.

20. The video encoder of claim 16 wherein said encoded virtual reference data and one encoded portion of said original video signal which is to be displayed are incorporated into said encoded video signal together as an encoded dual block.

21. The video encoder of claim 20 wherein the encoded dual block further comprises a motion vector representative of a relocation within a video frame that is to be associated with the encoded virtual reference data incorporated in the encoded dual block.

22. The video encoder of claim 15 wherein the encoded video signal comprises a block-based encoding of said original video signal, wherein one of said portions of the original video signal which is to be displayed is comprised in a given frame of said original video signal, wherein said virtual reference data is generated based on said given frame of said original video signal, and wherein said one of said portions of the original video signal which is to be displayed is encoded based on said encoded virtual reference data with use of an intra-coding prediction scheme.

23. A video decoder configured to generate a decoded video signal for use in a subsequent video display of an original video signal, the original video signal comprising a sequence of video frames, the encoded video signal having been generated from the original video signal, the video decoder comprising a processor and a memory, the memory including machine-executable code which when executed configures the processor to,
- identify in said encoded video signal an indication that encoded virtual reference data has been incorporated therein, wherein said encoded virtual reference data does not represent any portion of any individual frame of the original video signal which is to be displayed in said subsequent video display thereof;
- decode from said encoded video signal said encoded virtual reference data incorporated therein; and
- decode from said encoded video signal one or more encoded portions of the original video signal which are to be displayed in said subsequent video display thereof, wherein said encoded portions of said original video signal which are to be displayed are based on and specifically reference a portion of said encoded virtual reference data.

24. The video decoder of claim 23 wherein said encoded video signal comprises a block-based encoding of said original video signal, wherein said encoded virtual reference data comprises one or more encoded virtual reference blocks, wherein said encoded portions of said original video signal which are to be displayed are based on said encoded virtual reference data and have been encoded with use of a block-based motion compensated prediction scheme, and wherein decoding from said encoded video signal said one or more encoded portions of the original video signal which are to be displayed comprises performing block-based motion compensation on the decoded virtual reference data.

25. The video decoder of claim 23 wherein the machine-executable code further configures the processor to store said decoded virtual reference data in a reference frame buffer.

26. The video decoder of claim 24 wherein said encoded virtual reference data and one encoded portion of said original video signal which is to be displayed have been incorporated into said encoded video signal together as an encoded dual block.

27. The video decoder of claim 26 wherein the encoded dual block further comprises a motion vector representative of a relocation within a video frame that is to be associated with the encoded virtual reference data incorporated in the encoded dual block, and wherein the machine-executable code further configures the processor to relocate the decoded virtual reference data based upon said motion vector.

28. The video decoder of claim 23 wherein the encoded video signal comprises a block-based encoding of said original video signal, wherein one of said encoded portions of the original video signal which is to be displayed is comprised in a given frame of said original video signal, wherein said virtual reference data has been generated based on said given frame of said original video signal, and wherein said one of said encoded portions of the original video signal which is to be displayed has been encoded based on said encoded virtual reference data with use of an intra-coding prediction scheme.

* * * * *